Feb. 23, 1932.　　　A. J. DODGE　　　1,846,851
ANIMAL TRAP
Filed Nov. 25, 1930
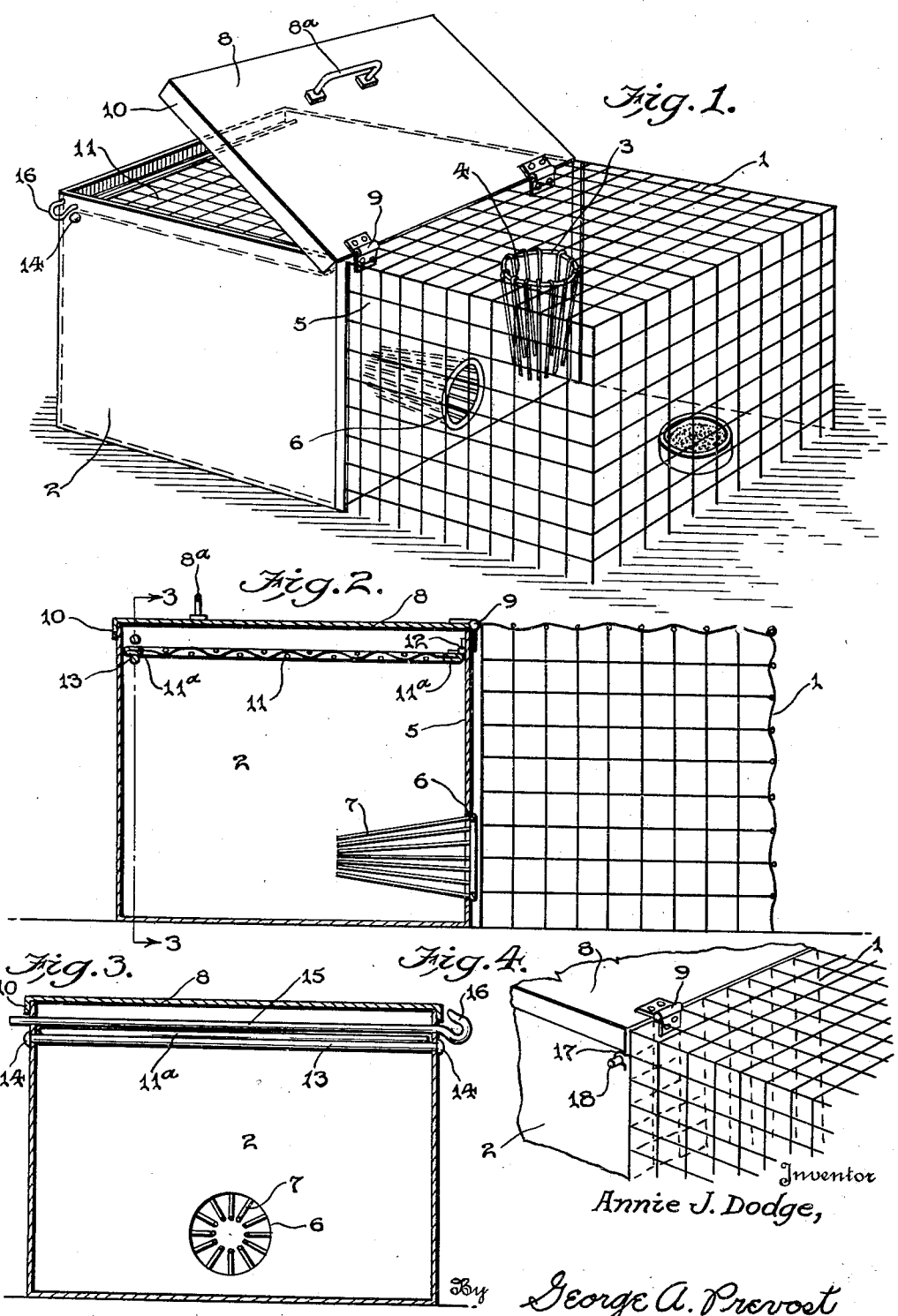
Inventor
Annie J. Dodge,
By 
Attorney Patented Feb. 23, 1932

1,846,851

UNITED STATES PATENT OFFICE

ANNIE J. DODGE, OF WASHINGTON, DISTRICT OF COLUMBIA

ANIMAL TRAP

Application filed November 25, 1930. Serial No. 498,124.

My invention consists in new and useful improvements in animal traps and relates particularly to that type of trap adapted for catching various types of rodents such as mice, rats, weasels and the like, my object being to provide a simple, efficient trap, having no working parts which are likely to become out of order, and one which is comparatively inexpensive to manufacture.

Another object of my invention is to provide a trap having two compartments, one a bottomless compartment and the other an imprisoning compartment. A construction of this kind enables the trap to be placed on the floor or on a table with the bottomless compartment resting over a small quantity of spilt grain or other food stuff, without the latter having been touched by human hands.

Still another object and advantage of my improved trap is that it is especially adapted for the use of grain and bird seed as bait, there being no baiting hooks or trays which might retain the rancid odor of such bait as cheese, bacon or the like, heretofore used. This affords a sanitary trap and one which can be easily disinfected after being used.

A further object of the invention is to provide an imprisoning chamber which is completely enclosed and into which the animal enters from the bottomless compartment as an apparent means of escape, said enclosed compartment hiding the imprisoned animal from view and thus obviating the possibility of its frightening other animals.

A still further object of my invention is to provide a trap which in no way injures or tortures the animal, said trap being so constructed that it may be easily immersed in a receptacle containing water, to drown the imprisoned animal or animals.

With the above and other objects in view which will appear as the description proceeds, my invention consists in the novel features herein set forth, illustrated in the accompanying drawings, and more particularly pointed out in the appended claim.

Referring to the drawings in which numerals of like character designate similar parts throughout the several views, Fig. 1 is a perspective view of my improved trap.

Fig. 2 is a longitudinal sectional view through the trap.

Fig. 3 is a sectional view taken on line 3—3 of Fig. 2, and,

Fig. 4 is a fragmentary view showing a modified form of my invention embodying detachable compartments.

As clearly shown in the drawings, my improved trap comprises two compartments, 1 a bottomless compartment and 2 an imprisoning compartment, the former consisting of top and side walls and an outer end wall constructed of wire of any suitable mesh. The top wall is provided with a substantially circular opening 3 located at any desired point, but preferably toward one side thereof, said opening being just sufficient in circumference to permit the entrance of a rodent, and having a depending sleeve 4 formed of a series of wires, the upper ends of which are secured at the edges of the opening 3, their lower ends being free and converging, to provide a substantially conical non-return entrance. While I have illustrated the entrance as located in the top of the compartment 1, it is obvious that the same may be situated in the side walls if desired.

The imprisoning compartment 2 is secured to the bottomless compartment 1 in end to end relation, by any suitable means, its inner end wall 5 also forming the inner end wall of the bottomless compartment 1. This wall 5 is provided towards its lower end with an opening 6 similar to the opening 3 and equipped with a substantially conical sleeve or non-return entrance 7 of the same structure as the sleeve 4, and extending horizontally within the compartment 2. The remaining walls and bottom of the compartment 2 are imperforate and the top of the compartment is closed by a cover 8 hinged as at 9 to the upper extremity of the wall 5, said cover 8 preferably being provided with downwardly extending flanges 10 which fit over the walls of the compartment 2. This cover may, if desired, be equipped with a suitable handle 8a.

Within the upper portion of the compartment 2, below the cover 8, I provide a second or auxiliary cover 11, preferably composed of wire of a suitable mesh and hinged to the wall 5 as at 12, whereby when the cover 8 is raised, an animal in the compartment 2 may be viewed, but is prevented from escape. This second or auxiliary cover 11 is reinforced by a suitable frame 11a which extends entirely around the same, the cover being supported at its free end on a pin or rod 13 which projects through and extends between the end walls of the compartment 2, being preferably riveted or otherwise rigidly secured at its longitudinal extremities 14, see Fig. 3.

In order to retain the auxiliary cover 11 in closed position, I provide a second rod 15 which is removably secured in suitable openings in the end walls of the compartment 2, located above the cover 11 and preferably in line with the stationary rod 13. This rod 15 may be formed with a hook portion 16 at one end, whereby when removed, the rod may be employed as a lifting tool for the auxiliary cover 11, thus serving a dual purpose and rendering a handle for this cover unnecessary.

The embodiment shown in Fig. 4 contemplates a removable or detachable bottomless compartment for the conservation of space in shipment. In this structure the bottomless compartment 1 is provided with four independent walls, the side adjacent the imprisoning compartment 2 being provided with hook members 17 adapted to engage projecting pins 18 in the side walls of the compartment 2.

With this arrangement, the bottomless compartment would be constructed of larger inside dimensions than the outside dimensions of the compartment 2, whereby the latter may be inserted in the former for shipment. Of course if this structure were adopted, the entrance sleeve 4 would necessarily have to be removable in order to permit the insertion of one compartment within the other.

The use and function of my improved animal trap are obvious.

We will assume, for example, that the device is to be used in a grain store or a bird store where grain or bird seed is frequently spilled upon the floor. Without touching the grain or bird seed with human hands to possibly frighten or warn an animal, the trap is placed with the bottomless compartment over a quantity of the spilt grain with the auxiliary cover 11 and the main cover 8 in closed position. It may be here noted that experience teaches that regular canary bird seed is the most effective bait known for mice. A rat or mouse is at once attracted by the grain within the compartment 1 and enters through the opening 3. Upon finding himself enclosed within this compartment, he seeks the nearest apparent means of exit and passes through the opening 6 into the imprisoning chamber 2, escape from which is rendered impossible by the substantially conical sleeve 7.

Being enclosed in the imprisoning compartment 2 he can neither see nor be seen by other animals to frighten the same away, and I have frequently found it possible with this trap, to capture as many as four or five mice within a short span of time.

The imprisoned animal or animals may then be easily disposed of by simply raising the main cover 8 and immersing the compartment 2 in a receptacle containing water, after which by removing the rod 15 and lifting the auxiliary cover 11 with the hook 16, the compartment 2 may be emptied.

If the trap is to be used in a home, it may be desirable to bait the trap by pouring a small quantity of bird seed in a dish or other receptacle and placing the bottomless compartment thereover as shown in Fig. 1 of the drawings.

It will thus be seen that I have provided a simple and efficient animal trap which is a decided improvement over any structures heretofore known and one which enables rodents and the like to be captured and disposed of in a humane manner.

From the foregoing it is believed that the construction and use of my invention may be readily understood by those skilled in the art without further description, it being borne in mind that numerous changes may be made in the details of construction without departing from the spirit of the invention as set out in the following claim. For instance, the trap may with equal effect, be made of any dimensions and in various shapes other than that illustrated in the drawings, such as oval or cylindrical.

What I claim and desire to secure by Letters Patent is:—

An animal trap comprising a bottomless compartment formed with its side walls, top and one end wall of wire mesh, an enclosed dark compartment adjacent said bottomless compartment and formed with solid walls, bottom and top, the end wall of said dark compartment adjacent said bottomless compartment forming a partition between the two compartments, a non-return entrance in said bottomless compartment, a non-return opening in said partition leading from said bottomless compartment into said dark compartment, an auxiliary wire mesh cover within said dark compartment and below said top, said auxiliary cover and top being hingedly connected to one wall of said compartment, and means for securing said auxiliary cover in closed position.

In testimony whereof I affix my signature.

ANNIE J. DODGE.